May 27, 1941.   H. O. MERCIER   2,243,390
SAFETY DEVICE FOR BAND OVENS
Filed Aug. 16, 1939   3 Sheets-Sheet 1
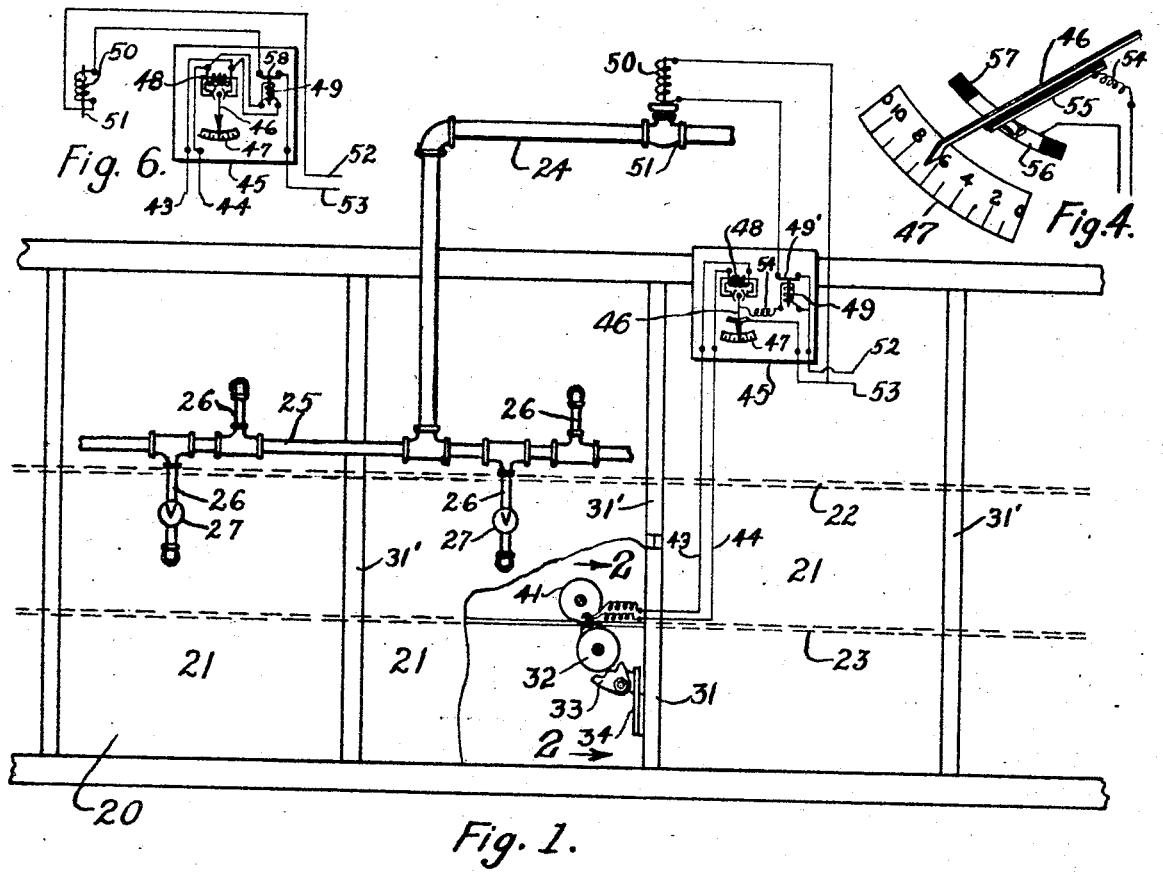
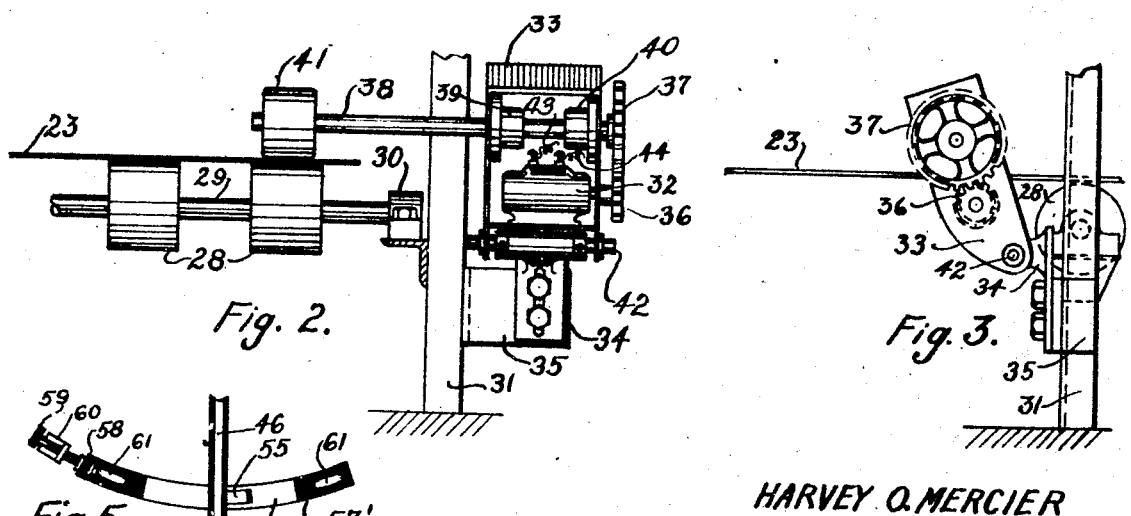
HARVEY O. MERCIER
INVENTOR.
BY Henry J Savage
ATTORNEY

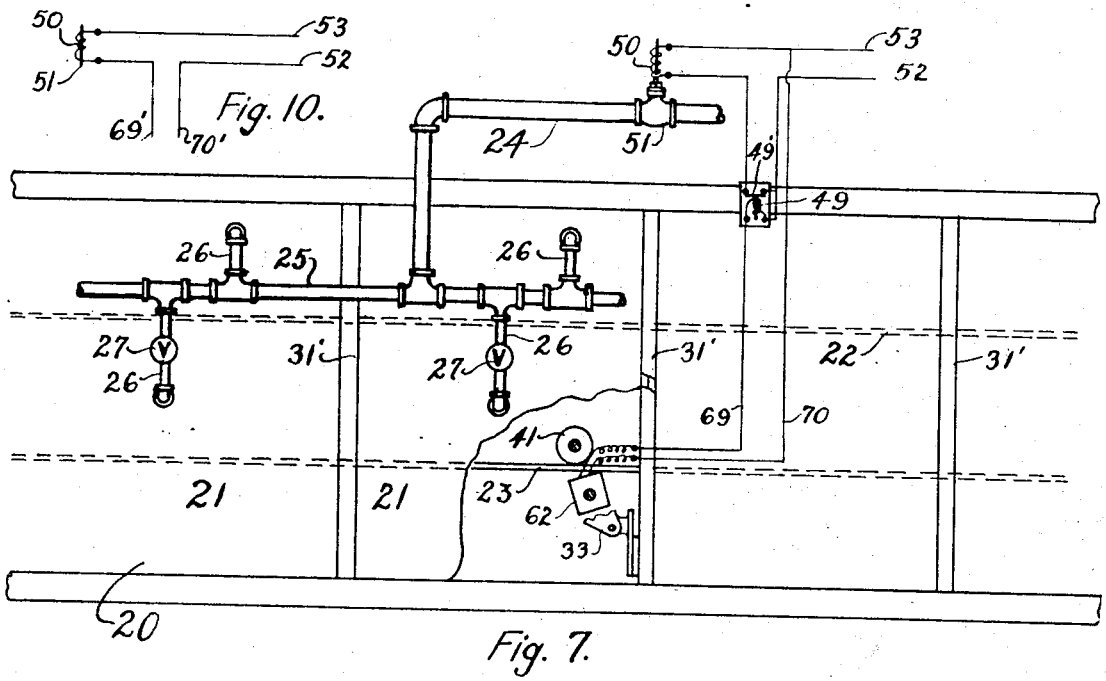
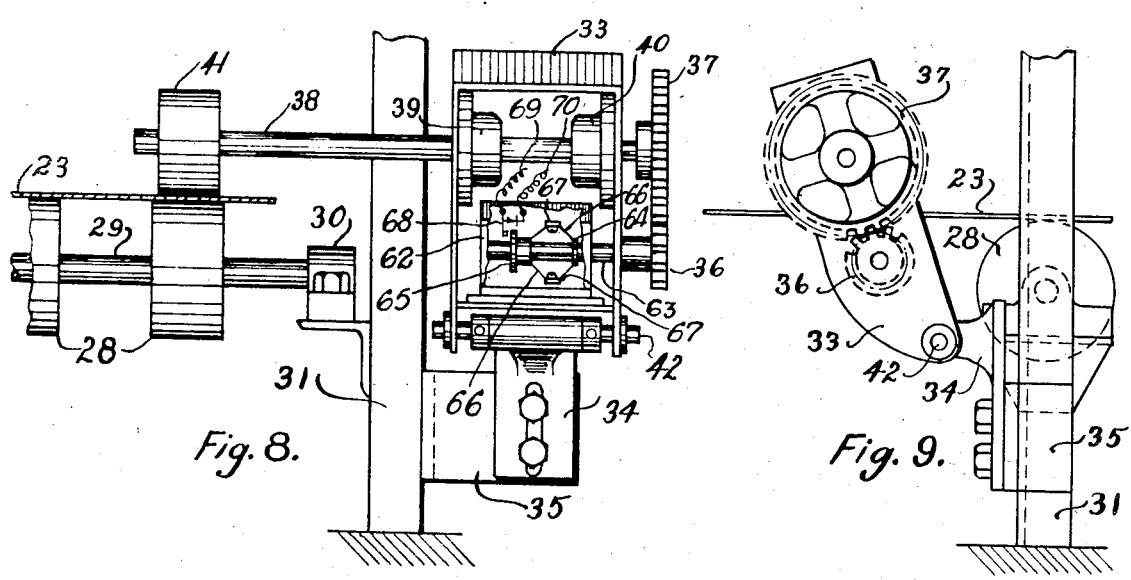

May 27, 1941.         H. O. MERCIER              2,243,390
SAFETY DEVICE FOR BAND OVENS
Filed Aug. 16, 1939          3 Sheets-Sheet 3
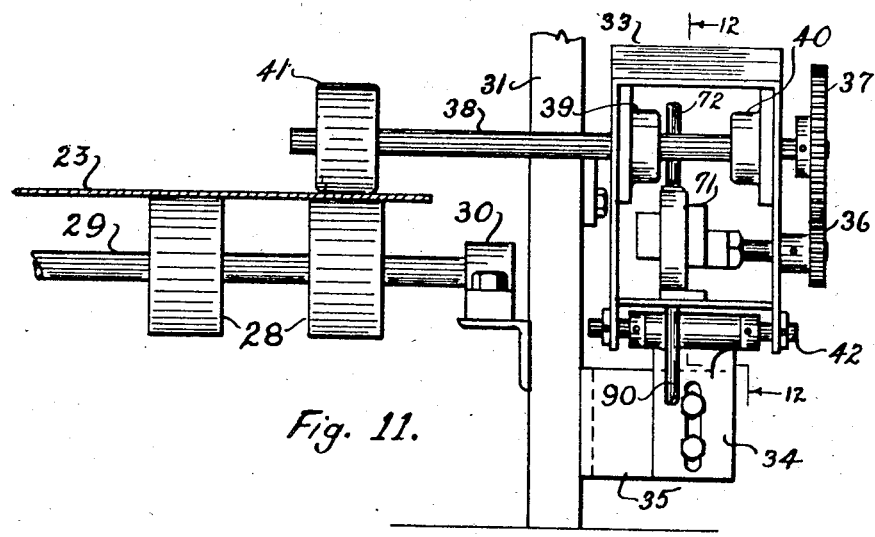
Fig. 11.
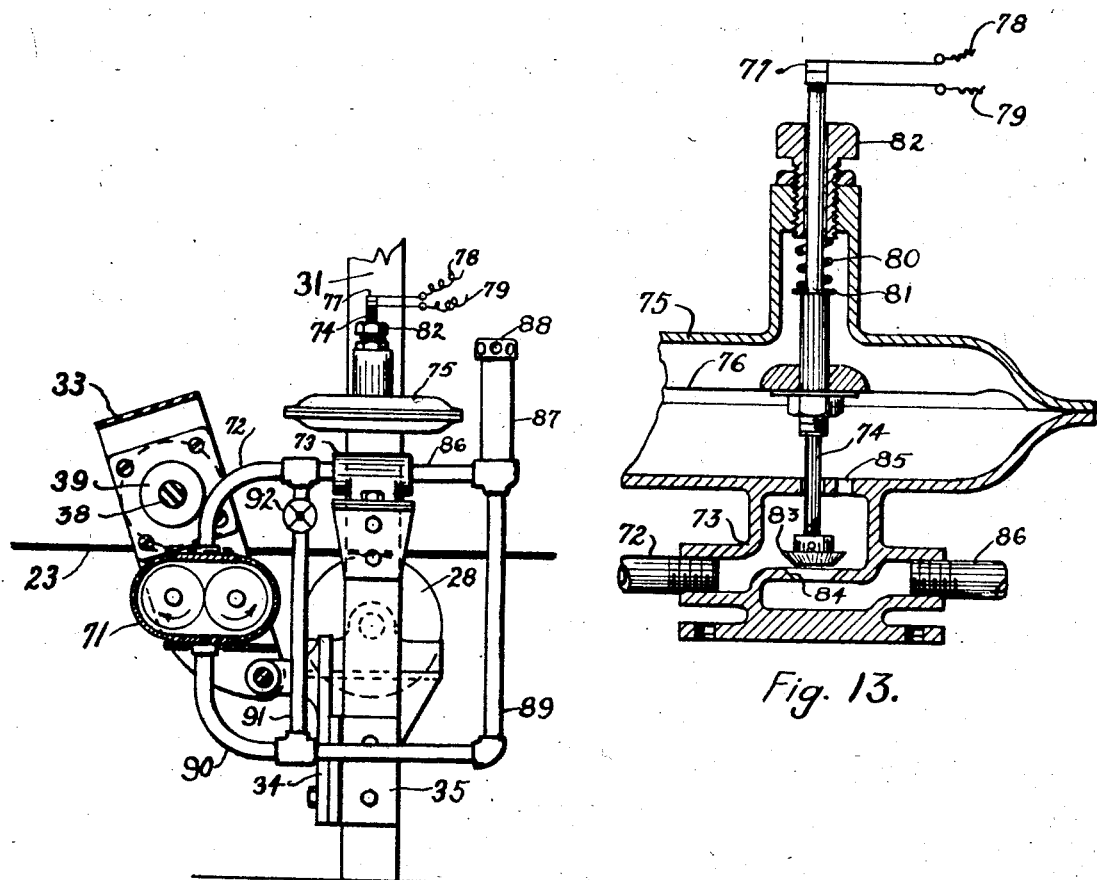
Fig. 12.
Fig. 13.
HARVEY O. MERCIER
INVENTOR.
BY Henry J. Savage
ATTORNEY Patented May 27, 1941

2,243,390

UNITED STATES PATENT OFFICE 2,243,390

SAFETY DEVICE FOR BAND OVENS

Harvey O. Mercier, East Orange, N. J., assignor to National Biscuit Company, New York, N. Y., a corporation of New Jersey Application August 16, 1939, Serial No. 290,523

10 Claims. (Cl. 107—57)

My invention relates to safety devices for band ovens and particularly to a device to protect the band from overheating and the products from burning by automatically shutting off the heat or fuel supply when the band stops or its rate of travel drops so low that the band or the goods being baked may be burned.

Band ovens have come into quite extensive use in the baking and other industries, wherein the articles to be baked or heat treated are supplied to the upper run of an endless conveyor at one end of the oven, pass through the oven, and are delivered as finished products at the opposite end. The conveyors in these ovens are very expensive, often being 500 feet or more in length, and made from a special grade of sheet steel, open mesh steel fabric or other suitable material. For efficiency, the heat (usually from gas or oil burners) is applied very close to the under side of the upper run of the band and since it is very thin, usually not over 1/32 to 3/64 inch in thickness, it heats to a high temperature very quickly. These ovens have a very large capacity or output and require a large amount of heat at a relatively high temperature. Therefore, if the drive or movement of the band through the oven be interrupted or slowed down materially for even a matter of seconds, it may be overheated and ruined, and the products burned, resulting in a loss of thousands of dollars, unless the heat be shut off simultaneously with the stopping or slowing down of the band. These ovens are used for baking a wide variety of goods and at widely varying temperatures. The baking time may vary from as little as 2 minutes for very thin wafers up to as much as 45 minutes for a loaf of bread, and the temperatures in the oven may vary from 400 degrees to 700 degrees. The control mechanism must be adjustable to control the oven under all these widely divergent operating conditions.

The principal object of my invention, therefore, is to provide means controlled by the band itself to automatically shut off the fuel supply when the band stops or falls below a predetermined minimum speed. Another object is to provide a visible indicator of the speed or rate of travel of the band in the oven in conjunction with the control means, the indicator preferably being calibrated to indicate baking times rather than absolute speeds. Another object is to provide an electrically controlled indicator which may be adjusted so that the minimum speed of the band at which the fuel supply will be shut off may be varied in accordance with oven operating conditions.

Another object is to provide means that will prevent fuel being supplied to the oven unless the oven band is up to at least its minimum safe speed.

The above and other objects and advantages are attained by my invention of which I have illustrated three modified forms in the accompanying drawings wherein:

Fig. 1 is a side elevation of a part of a band oven with one form of my invention applied thereto, one of the side covers of the oven and the frame of the control mechanism being partly broken away.

Fig. 2 is a side elevation of an electric generator assembly driven from the band for actuating the indicator and fuel controls, the view being taken in the direction of the arrows 2—2 on Fig. 1.

Fig. 3 is an end elevation of Fig. 2 looking from the right.

Fig. 4 is an enlarged view of the indicator of Fig. 1.

Fig. 5 is a plan view of an indicator similar to that of Fig. 4 but having an adjustable contact element whereby the fuel may be shut off at different band speeds. Fig. 5A is a front elevation of Fig. 5.

Fig. 6 shows a modified form of relay control.

Fig. 7 is a view similar to Fig. 1 but with a speed controlled switch as the primary control element.

Figs. 8 and 9 are side and end elevations respectively of the primary control element of Fig. 7 and its associated driving mechanism.

Fig. 10 illustrates how the speed controlled switch may be connected directly in the fuel valve solenoid circuit.

Fig. 11 is a side elevation of a control mechanism actuated by fluid pressure.

Fig. 12 is an end elevation, partly in section on the line 12—12 of Fig. 11.

Fig. 13 is an enlarged section through the diaphragm control valve.

Referring first to Figs. 1 to 4, I have illustrated one form of my invention wherein an electric generator is driven directly from motion of the band and current from it actuates a tachometer indicating the relative speed of the band or the baking interval in the oven and a relay in the circuit controlling the fuel supply. This furnishes a visible indication at all times of the baking speed of the oven and automatically shuts off the fuel supply if the band stops or its speed drops below the danger point.

20 indicates a portion of a band oven which is enclosed by a number of removable side panels 21 (three being shown), and through which the upper run 22 and lower run 23 of an endless band pass. The band, which may be a sheet steel band, an open mesh band, or other kind of conveyor suitable for the purpose, passes around drums (not shown) at the two ends of the oven and is driven at uniform speed by frictional contact with one or both of them.

A fuel line 24 supplies fuel which may be a mixture of gas or oil and air to a header 25 extending along the oven and connected to branches 26 leading to fuel burners above and below the upper run 22. Some or all of the branches 26 may be controlled by manually operated valves 27.

The two runs of the band 22, 23, are supported by rollers or other suitable form of guides 28 at several points to prevent their sagging. On the lower run 23, these supports are rollers 28 (Fig. 2) fixed to shafts 29 journalled in bearings 30 supported by the frame of the oven. These supports usually are adjacent the vertical legs 31 which coincide with the finishing strips 31' that cover the abutting edges of the cover panels 21. On one of the legs 31, adjacent to one of the supports 28, I mount the generator 32 that is driven from the band to supply current to the indicator and controls.

Referring to Figs. 2 and 3, this generator 32 is carried by a U-shaped yoke or frame 33 that is pivotally supported at its lower end on a bearing bracket 34 adjustably mounted on a flange 35 secured to the leg 31. The shaft of the generator extends through one side of the U-frame and carries a pinion 36 meshing with a gear 37 keyed to a shaft 38 journalled in bearings 39, 40, on the two legs of the frame 33. The inner end of shaft 38 extends into the oven and has a friction drive roller 41 which rests on and is driven by the lower run 23 of the band. The pivotal mounting of the frame 33 on the shaft 42 in the bracket 34 permits the frame to oscillate slightly due to unevenness of the band and always maintain the roller 41 in driving contact therewith. As shown in Figs. 2 and 3, the roller 41 rests on the band 23 close to one of the supports 28 so that the band is not flexed by the weight of the generator and its driving mechanism.

The bracket 34 is vertically adjustable so that the pressure of the friction drive roller 41 upon the band may be varied. When the bracket 34 is in its highest position (Figs. 2 and 3), the frame 33 will have its greatest inclination toward horizontal and the roller 41 will bear heaviest on the band. When the bracket 34 is in its lowest position, the frame 33 will be nearly vertical and the roller 41 will exert very little pressure on the band. By proper adjustment of the bracket, the frictional drive may be varied to suit different band speeds, materials, and operating conditions.

The voltage of the current generated by the generator 32 is proportional to its speed which is controlled by the speed of the band 23. The current from the generator is carried by the wires 43, 44 to a combined speed indicator and control mounted on a panel or in a cabinet 45 which is shown secured to the side of the oven where it is clearly visible, but may be mounted at any convenient place in the baking room.

The speed indicator or tachometer has a pointer 46 adapted to swing along a dial 47 that preferably is graduated in baking intervals or minutes that it takes the band to travel through the oven. Thus when the pointer 46 (Fig. 4) is adjacent the lower numbers on the dial 47 the band is traveling at its highest speed and the baking time is the shortest. When it points to the larger numbers, the band speed is the slowest and the baking time the longest. Current from the generator 32 is lead by the wires 43, 44 to the field coil 48 which controls the movement of the pointer 46. The pointer 46 is connected in the circuit of a relay 49 which in turn controls a solenoid 50 that governs the open and closed positions of the valve 51 in the fuel main 24.

The pointer 46 is connected in the circuit of the relay 49 which, as shown in Fig. 1, may be a shunt on the circuit 52, 53 of the valve control solenoid 50. One lead 54 of this shunt circuit is connected to the pointer 46 or to a contact 55 carried by, but insulated from, the pointer. This contact 55 moves with the pointer along a fixed contact 56 to which the other side of the shunt is connected. The contact 56 is insulated from the machine by an insulator 57. When the elements 55 and 56 are in contact, the shunt circuit is closed and the relay 49 energized to hold the switch 49' closed in the valve relay circuit and this holds the gas supply valve 51 open.

When the speed of the band and consequently the current from the generator 32 drops too low, the contact 55 will ride off the contact 56 and break the circuit through the relay 49. This opens the circuit to solenoid 50, which being de-energized, permits the valve 51 to close and cut off the fuel supply. This happens either when the band stops or when its speed drops so low that there would be danger of overheating and damaging it or the product being baked or dried.

The position of the indicator 46 not only serves to apprise the operator of the band speed but also shows the proximity of the band speed to the critical speed at which the fuel valve solenoid will be opened or closed, and also whether the trend of the band speed is toward or away from that critical speed. Thus if the oven is in operation with articles being supplied to the band, the position of the pointer always shows to the operator whether or not the band speed is within safe limits so that charging of the oven may continue. If the indicator shows that the band speed is falling off or approaching the speed at which the fuel valve will be closed, he knows that operating conditions are not correct, and can make proper adjustments or discontinue the supply of articles to the oven before the fuel is automatically shut off and an ovenfull of goods spoiled.

Since these ovens are suitable for baking, drying and otherwise treating a wide variety of products other than baked goods, it is desirable to have the contact 56 adjustable so that the minimum speed of the band at which the fuel supply is shut off may be varied in accordance with different operating conditions. I have shown how the contact may be adjustably mounted in Figs. 5 and 5A. The contact 56 is fixed to an insulator 57' which at one end has a flange 58 in which one end of an adjusting screw 59 is rotatably mounted. This screw 59 has screw threaded engagement with a bracket 60 adapted to be fixed to the panel 45. By adjusting this screw, the position at which the contacts 55 and 56 open the relay circuit can be varied. The insulator 57' is provided with means such as the slots 61 through which screws extend to secure it to the panel 45 yet permit it to be moved when adjusted by screw 59.

In Fig. 6, I have shown a slightly modified form of my invention wherein the circuit for the relay 49 is in parallel with or a shunt on the field coil 48 and receives its current from the generator 32.

In Figs. 7 to 9, I illustrate another modification wherein the generator 32 is replaced by a centrifugally operated switch in the relay circuit. The oven, the fuel connections and the mounting and drive for the control means are the same as in Figs. 1 to 3 and are indicated by the same reference numbers. I replace the generator 32 by a centrifugal switch which has a housing 62 (Fig. 8) in which the shaft 63 is journalled and driven by gear 36. On this shaft is a fixed abutment 64 and a slidable collar 65 connected by spring members 66 on which the weights 67 are secured. The collar 65 is adapted to engage a switch 68 which normally closes the circuit 69, 70 of the relay 49. The relay circuit 69, 70 may be a shunt on the main valve control line 52, 53 (as shown) and normally is closed by switch 68 when the oven band is running and the rotor of the centrifugal switch 62 is rotating. When the shaft 63 is rotating at a speed greater than the minimum speed of the oven band, the weights 67 are thrown out and the collar or circuit breaker 65 held out of engagement with the switch 68. If the band stops or its speed gets dangerously low, the centrifugal force acting on weights 67 is not great enough to overcome the springs 66 and the weights move in toward the center forcing the circuit breaker 65 to the left and opening the switch 68. This de-energizes the relay 49 and opens the switch 49' in the fuel valve solenoid circuit, thereby de-energizing solenoid 50 and closing the fuel valve 51.

In Fig. 10, I show how the relay 49 may be dispensed with and the switch 68 connected directly to the wires 69', 70' in one side of the fuel valve solenoid circuit.

In Figs. 11 to 13, I show a still further form of my invention in which the fuel valve solenoid is controlled by fluid pressure. In this form of the invention, the electric generator 32 or switch 62 is replaced by a fluid pressure generator 71 (Fig. 12) which I have illustrated as a gear pump, but any suitable fluid pressure generator may be used.

This generator 71, like generator 32, is driven from gear 36 and its outlet is connected by a flexible pipe 72 to the inlet side of a valve 73 having a stem 74 extending upward into a diaphragm casing 75 and secured to a diaphragm 76 that extends across the casing. The stem 74 extends beyond the diaphragm and at its upper end is adapted to close a switch 77 in a circuit 78, 79, which may be either the circuit of the relay 49 or solenoid 50 or any other suitable control circuit. A coil spring 80 surrounds the stem 74 and at one end bears on a shoulder 81 on the stem and at the other end engages an adjusting nut 82 by means of which the pressure of the spring may be adjusted. When there is no pressure in the diaphragm chamber, or the pressure is below a predetermined minimum, the spring 80 in conjunction with the diaphragm 76 forces the valve head 83 down on its seat 84 and opens the switch 77, which de-energizes the relay and shuts off the fuel supply. From the inlet side of the valve there is a port 85 leading to the diaphragm chamber below the diaphragm 76. Fluid entering the valve from the pump 71 flows through this port and exerts sufficient pressure on the diaphragm 76 to raise the valve stem 74 and close the contacts 77. The valve 51 then opens so that the gas may be ignited in the oven when the band gets up to normal speed. When the band is not running there will be no fluid pressure on the diaphragm 76 and the valve 83 will remain seated and the switch 77 open.

An outlet pipe 86 leads from the valve 73 to a well or overflow chamber 87 having a perforated cap 88 so that it is open to the atmosphere. A pipe 89 leads from this reservoir to a flexible pipe 90 that connects with the inlet to pump 71. The pump outlet and inlet pipes may be connected by a by-pass 91 having a valve 92 so that the pressure of the fluid within the valve 73 and on the diaphragm 76 may be regulated and adjusted so as to open the switch 77 at different band speeds, as may be required by different operating conditions in the oven.

I prefer to use a light oil for the fluid to operate the diaphragm and sufficient oil is used to fill the entire system including the pump 71, pipes 72, 86, 89, 90 and 91, diaphragm casing below the diaphragm 76 and the well 87 up to about the level of the diaphragm 76. This supplies a reserve of oil in the well that flows into the system when its volume increases with raising of the diaphragm 76 and a storage chamber into which the excess oil flows when the diaphragm falls. The capacity of the well 87 must be somewhat greater than the volumetric displacement of the diaphragm. The perforated cap 88 provides breathing openings for the well so that the oil may flow freely to and from it.

When the band 23 is stationary or moving very slowly there will be little or no pressure exerted on the diaphragm 76, the valve 83 will remain seated and the switch 77 open so that fuel cannot be turned on at the oven. When the band attains its minimum safe speed, or any speed in excess thereof, oil from the pump 71 will enter under the diaphragm 76 and raise it against the pressure of the spring 80 and close the contacts 77 in the relay control circuit 78, 79. This will open the fuel valve and permit the fuel to be ignited in the oven. If the band stops or slows down to too slow speed, the pump 71 will stop or slow down to such an extent that the oil pressure on the diaphragm 76 is insufficient to overcome the spring 80. The spring and diaphragm then force the valve 83 and stem 74 down thereby opening the switch 77 and shutting off the fuel supply before the band and product can be overheated and damaged.

In some cases, the friction drive wheel 41 may be driven by contact with one of the drums about which the band passes or other movable part of the oven. However, it is not always satisfactory to drive the control mechanism from the driving drum because, due to slippage, the drum speed often is greater than the band speed, and in case of an obstruction in the oven, or loss of tension due to failure of band expansion take-up mechanism, the band may come to a complete stop while the driving drum is still turning at its normal speed. For these reasons I prefer to drive the control mechanism from the band or from the driven drum so that its operation always is a function of band speed.

I have not shown a visible indicator, such as the pointer 46 and dial 47, in connection with either Fig. 8 or Fig. 12, but it will be understood that a suitable indicator of the oven band speed may be actuated from the switch 62 or pump 71 or any part of their associated driving mechanisms.

I have shown and described the fuel valve 51 as being held open by the solenoid 50 and closed when the solenoid circuit is open. This is but illustrative of one form of the invention which contemplates as an equivalent that in the normal operation of the oven, the solenoid circuit may be open when the valve is open, and the valve 51 closed when the solenoid 50 is energized. In that case a switch will be closed instead of opened in either the main or auxiliary circuit when the band stops, which stop may not be a state of absolute rest but includes motion below the critical minimum.

It will thus be seen that my invention provides means for protecting the band of an oven from being injured by overheating and the goods in the oven from being destroyed by preventing the fuel from being supplied until the band reaches a safe minimum speed and by shutting off the fuel if the band should fall below that speed.

While I have shown several embodiments of my invention, it is capable of many other modifications and adaptations that will now present themselves to those skilled in this art and I claim all such that may come within the scope of my claims or be equivalents thereof.

What I claim is:

1. In an oven of the type having an endless band driven by drums at the ends of the oven, the combination of the endless band, a fuel line for supplying fuel to the oven to heat the band, a valve in said fuel line, a solenoid adapted when energized to open the fuel valve, an electric circuit in which said solenoid is normally connected, a switch closing said circuit during normal operation of said oven, a generator driven from said band, a relay connected as a shunt on said solenoid circuit and adapted when energized to hold said switch closed, a switch in said shunt circuit, and means energized by current from said generator to close said shunt circuit switch when the generator is driven above a predetermined minimum speed and to open said switch when the generator drops below said minimum speed.

2. In an oven of the type having an endless band driven by drums at the ends of the oven, the combination of the endless band, a fuel line for supplying fuel to the oven to heat the band, a valve in said fuel line, a solenoid adapted when energized to open the fuel valve, an electric circuit in which said solenoid is normally connected, a switch closing said circuit during normal operation of said oven, a generator driven from said band, a relay connected as a shunt on said solenoid circuit and adapted when energized to hold said switch closed, a switch in said shunt circuit, means energized by current from said generator to close said shunt circuit switch when the generator is driven above a predetermined minimum speed and to open said switch when the generator drops below said minimum speed, and a visible indicator connected to move in unison with a movable element of said shunt circuit switch and actuated by current from said generator whereby the indicator will show the relative speed of the band and the proximity of band speed to the critical speed at which the fuel valve solenoid circuit is opened or closed.

3. In a control device for ovens of the type having an endless conveyor and means for driving the same, the combination with the conveyor of a generator driven therefrom, an electric relay in the oven control, an indicator actuated by energy from said generator, a fixed contact in said relay circuit, a movable contact in said relay circuit carried by said indicator, said fixed contact being in the path of the movable contact and engaged thereby when the indicator is actuated by the generator, said contacts being separated when the generator current is insufficient to actuate the indicator.

4. In a control device for ovens of the type having an endless conveyor and means for driving the same, the combination with the conveyor of a generator driven therefrom, an electric relay in the oven control, an indicator actuated by energy from said generator, a fixed contact in said relay circuit, a movable contact in said relay circuit carried by said indicator, said fixed contact being in the path of the movable contact and engaged thereby when the indicator is actuated by the generator, said contacts being separated when the generator current is insufficient to actuate the indicator, and means to adjust said fixed contact to vary the point at which the contacts are separated.

5. In a control device for ovens of the type having an endless conveyor and means for driving the same, the combination with the conveyor of a rotatable contact breaker driven therefrom, a fuel line for supplying fuel to the oven, an electrically controlled valve in the fuel line, an electric circuit normally closed to hold said fuel valve open, a relay operating when energized to close a switch in said fuel valve circuit, a relay circuit having a switch therein that is normally closed, said contact breaker when rotating being held out of contact with said second named switch and when not rotated breaking the relay circuit by opening said second named switch.

6. In an oven of the type having an endless band driven by drums at the ends of the oven, the combination of the endless band, a fuel line for supplying fuel to the oven to heat the band, a valve in said fuel line, a solenoid adapted when energized to open the fuel valve, an electric circuit in which said solenoid is normally connected, a switch closing said circuit during normal operation of said oven, a fluid pressure generator driven from the band, a pressure responsive device adapted to close said switch upon receiving pressure from said generator, and means for opening said switch upon failure of pressure from said generator.

7. In a control device for ovens of the endless band type, the combination of the oven frame, an endless band having upper and lower runs passing through said frame, a control frame pivotally mounted on said oven frame adjacent one run of the band, a shaft journalled in said control frame and extending into the oven above the band, a friction drive roller on the inner end of the shaft resting on the band whereby the weight of the control frame and associated parts is supported in part on its pivotal mounting and in part by the band, a generator mounted on said control frame and driven from said shaft, an electrically operated control circuit for said oven, means actuated by current from said generator to close the control circuit when the band speed is above a minimum, and means to open said control circuit when the band stops or drops below said minimum speed.

8. In a control device for ovens of the endless band type, the combination of the oven frame, an endless band having upper and lower runs passing through said frame, a control frame pivotally mounted on said oven frame adjacent one run of the band, a shaft journalled in said control frame and extending into the oven above the band, a friction drive roller on the inner end of the shaft resting on the band whereby the weight of the control frame and associated parts is supported in part on its pivotal mounting and in part by the band, a rotatable member mounted in said control frame and driven from said shaft, a fuel supply valve controlling the supply of fuel to the oven, electrically operated means for holding said valve open when its circuit is closed, means normally closing said circuit, and means controlled by said rotatable member to open said circuit and close said fuel valve when the speed of the band and rotatable member is below a predetermined minimum.

9. In a control device for ovens of the endless band type, the combination of the oven frame, an endless band having upper and lower runs passing through said frame, a control frame pivotally mounted on said oven frame adjacent one run of the band, a shaft journalled in said control frame and extending into the oven above the band, a friction drive roller on the inner end of the shaft resting on the band whereby the weight of the control frame and associated parts is supported in part on its pivotal mounting and in part by the band, a rotatable member mounted in said control frame and driven from said shaft, a fuel supply valve controlling the supply of fuel to the oven, electrically operated means for holding said valve open when its circuit is closed, means normally closing said circuit, means controlled by said rotatable member to open said circuit and close said fuel valve when the speed of the band and rotatable member is below a predetermined minimum, and means for vertically adjusting the pivotal support for the control frame to vary the weight thereof supported by the band.

10. In a control device for ovens of the endless band type, the combination of the oven frame, an endless band having upper and lower runs passing through said frame, a control frame pivotally mounted on said oven frame adjacent one run of the band, a shaft journalled in said control frame and extending into the oven above the band, a friction drive roller on the inner end of the shaft resting on the band whereby the weight of the control frame and associated parts is supported in part on its pivotal mounting and in part by the band, a generator mounted on said control frame and driven from said shaft, an indicator having a dial graduated to indicate band speed, a pointer movable along said dial, a field coil, a circuit to and from said generator through said field coil, said pointer being connected to be moved over said dial upon energization of the field coil in proportion to the current supplied to the field coil, whereby the indicator will show the speed of the band within the oven and variations in the position of the indicator will reveal the trend of band speed.

HARVEY O. MERCIER.